United States Patent [19]
Janson, Jr. et al.

[11] Patent Number: 5,560,563
[45] Date of Patent: Oct. 1, 1996

[54] LIGHT SHIELD FOR CLOSING THE FILM SLOT OF A FILM CARTRIDGE

[75] Inventors: Wilbert F. Janson, Jr., Shortsville; Douglas H. Pearson, Rochester; John E. Spencer, Geneseo, all of N.Y.

[73] Assignee: Eastman Kodak Company, Rochester, N.Y.

[21] Appl. No.: 458,328

[22] Filed: Jun. 2, 1995

[51] Int. Cl.$^6$ .................................................. G03B 17/26
[52] U.S. Cl. .................................................. 242/348.4
[58] Field of Search ............................ 242/348.4, 348.2, 242/588.5; 354/275

[56] References Cited

U.S. PATENT DOCUMENTS

| | | | |
|---|---|---|---|
| 3,645,434 | 2/1972 | Rab | 242/348.4 |
| 4,482,232 | 11/1984 | Engelsmann et al. | 242/348.4 |
| 5,200,777 | 4/1993 | Zander | 354/275 |
| 5,209,419 | 5/1993 | Zander . | |
| 5,319,407 | 6/1994 | Dirisio | 242/348.4 |
| 5,357,303 | 10/1994 | Wirt | 242/348.4 |

*Primary Examiner*—John M. Jillions
*Attorney, Agent, or Firm*—Peter J. Bilinski

[57] ABSTRACT

A light shield (40, 100) for closing the film slot (33) in a film cartridge (20) is configured as a light shielding strip (40, 100) which extends around a film strip (26) coiled on a supply spool (25) within the film cartridge (20). The light shielding strip (40, 100) has a first end portion (44, 102) for covering the film slot (33) and a second end portion (54) for engagement by the film lead (56) of the film strip (26). When the film strip (26) is initially advanced, detents (64) on the light shielding strip (26) are engaged temporarily by teeth (66) on the supply spool (25) to pull the light shielding strip (26) open so that the film strip (26) projects from the cartridge (20). Upon rewinding the film strip (26), a film lead portion (56) of the film strip (26) engages other detents (72, 142) on the light shielding strip (40, 100) to push the light shielding strip (40, 100) back over the film slot (33) to thereby again close the film slot (33).

14 Claims, 13 Drawing Sheets

5,560,563

LIGHT SHIELD FOR CLOSING THE FILM SLOT OF A FILM CARTRIDGE

FIELD OF THE INVENTION

The invention relates generally to the field of photography, and in particular to film cassettes which contain a roll of film.

BACKGROUND OF THE INVENTION

Film for still photography is sold as a strip wound into a roll on a spool disposed within a cartridge case. The cartridge case is provided with a film slot from which the film is pulled for exposure and then rewound after the entire roll has been exposed. In some instances, a roll is partially exposed and then rewound and removed from the camera and, at a later time, used again.

The film cartridge is opaque to shield the film strip within the cartridge from light; however, the slot through which the film strip passes is necessarily opened when advancing the film for exposure and when returning the film completely to the cartridge for subsequent development. As long as the cartridge is within the camera, the film is protected from light; however, when the camera is opened, light can enter through the film slot in the cartridge if the film slot has not been closed to light.

U.S. Pat. Nos. 5,200,777 and 5,209,419, assigned to the assignee of the present invention, each disclose pivoted doors which open when film is dispensed through the film slot and which close to seal the film slot after film has been projected from the film slot and is withdrawn back into the cartridge. In this way, when the cartridge is removed from the camera, the film is shielded from light.

While the doors disclosed in the above-identified patents close the film slot, the doors do not provide a shield which substantially completely surrounds the roll of film. Moreover, it may be relatively easy with the prior art arrangements to intentionally or unintentionally open the doors and thus expose the film to light.

SUMMARY OF THE INVENTION

There is provided a film cassette for containing a film strip of a selected width coiled around a film spool wherein the film cassette includes a film slot of a width complementing the width of the film strip. The film strip is dispensed through the film slot for exposure in a photographic device and then withdrawn back through the film slot after exposure. The film slot is closed when the film strip is completely coiled within the cassette. In accordance with the improvement comprising the invention, a light shielding strip is disposed in the film cartridge, separate from and around the film strip, when the film strip is coiled in the film cartridge. The light shielding strip has a width at least as wide as the film strip and at least as wide as the width of the film slot. A first end portion of the light strip covers the slot. As the film strip is advanced initially out of the slot, the light shielding strip is coupled to advance with the film strip. This withdraws the first end portion of the light shielding strip away from the slot, thereby opening the slot for the film strip to advance therethrough. After the film strip is drawn back into the film slot, the light shielding strip is recoupled to move with the film strip so that the end portion of the light shielding strip moves to again cover the film slot.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE INVENTION

The invention is disclosed as being embodied preferably in a 35 mm film cassette. Because the features of this type of film cassette are generally known, the description which follows is directed in particular to elements forming part of or cooperating directly with the disclosed embodiment. It is to be understood, however, that other elements, not specifically shown or described, may take various forms known to persons of ordinary skill in the art.

FIRST EMBODIMENT, FIGS. 1–7

Figure 1:
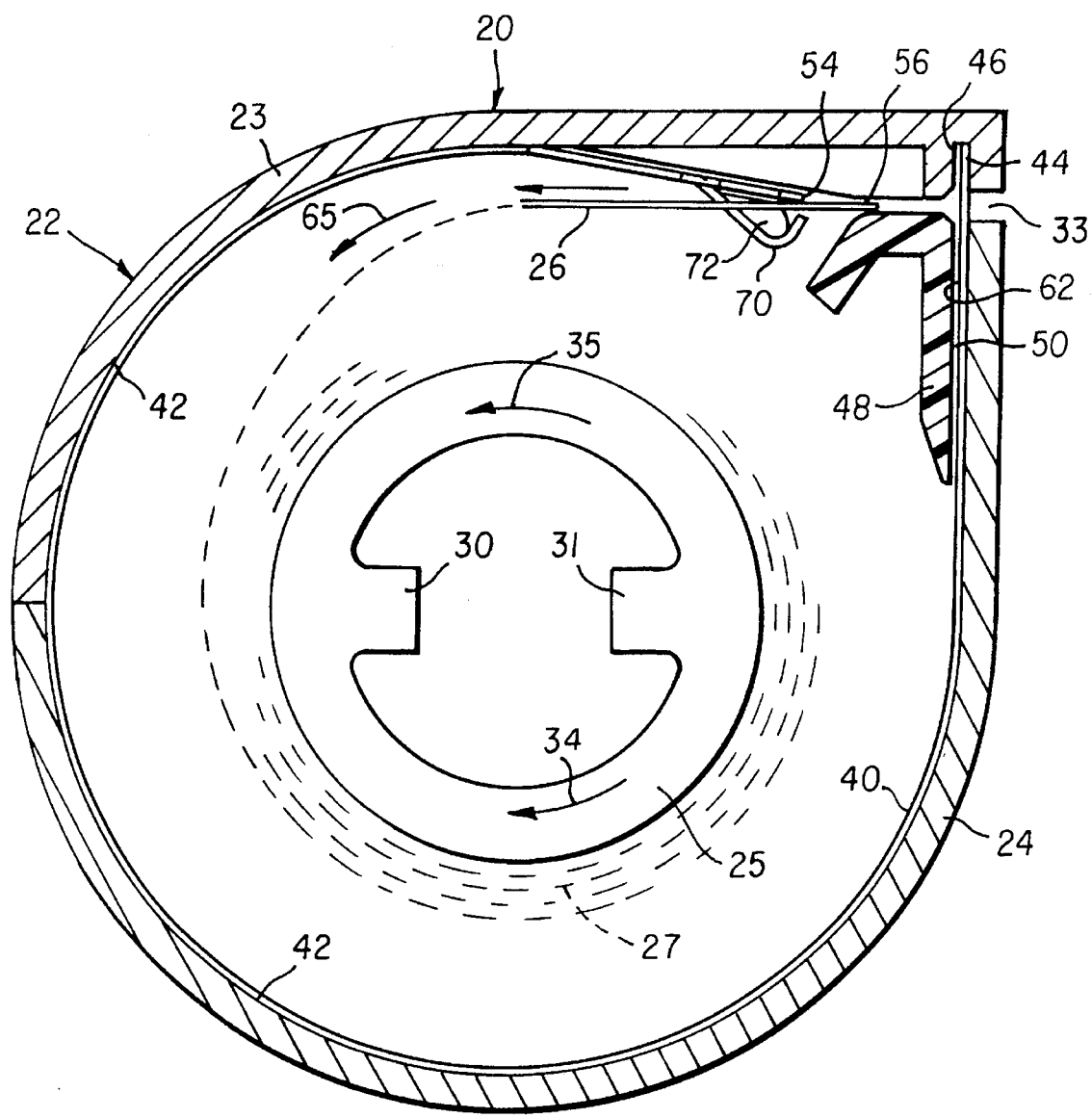
FIG. 1 is a side elevation view of a film cartridge including a coiled film strip and a light shielding strip in accordance with a first embodiment of the invention disposed therein, showing the light shielding strip closing a film slot in the film cartridge through which the film strip is dispensed and retrieved.
Figure 2:
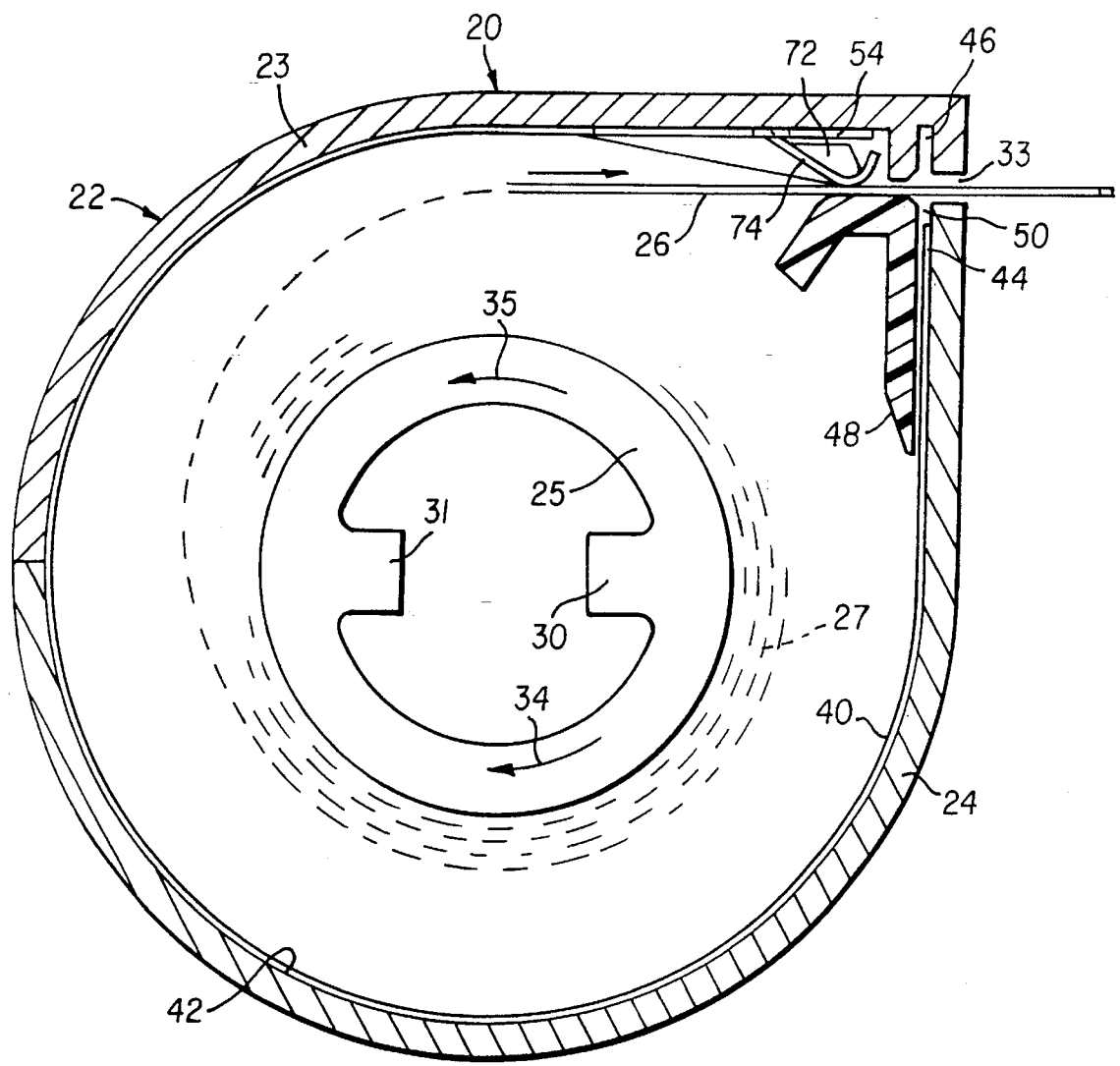
FIG. 2 is a view similar to FIG. 1 but showing the film slot opened with the film strip advanced through the slot.

Referring now to FIGS. 1 and 2, there is shown a film cartridge 20 having a housing 22 comprised of a first shell 23 and a second shell 24. The shells 23 and 24 cooperate to enclose a supply spool 25 on which a strip of photographic film 26 is coiled in a coil 27. The strip of photographic film has a number of frames (not shown) on which still photographs are made when the film strip 26 is exposed and then developed. While in the housing 22, the film strip 26 is coiled about the supply spool 25 which is driven by a motor (not shown) through a drive train (not shown), which drive train engages lugs 30 and 31 to dispense the film strip 26 through a film slot 33 in the housing when rotating in the direction of arrow 34. When rotated in the direction of arrow 35, the supply spool 25 retracts the film strip 26 and recoils the film strip therearound.

In accordance with the principles of the present invention, a light shielding strip 40 is disposed around the film strip 26 and abuts the inner cylindrical wall surface 42 of the housing 22.

As is seen in FIG. 1, the light shielding strip 40 has a first end portion 44 which is received in a groove 46 in the first shell 23 of the housing 20 on the other side of film slot 33 so as to extend transversely across the film slot to block light from entering the film slot. A cross brace 48 with a slot 50 is disposed opposite from the groove 46. The slot 50 and groove 46 stabilize the first end portion 44 of the light sealing strip 40. Since the first end portion 44 of the light shielding strip 40 is not pivoted as is the case in the prior art, it is very difficult to dislodge the first end portion from its position closing the slot 33. This results in a more secure closure than the closures of the prior art. As will be further explained hereinafter, the light shielding strip 40 also has a second end portion 54 which cooperates with the film lead 56 of the strip 26 to close the slot 33 with the first end portion 44 of the light shielding strip.

Figure 3:
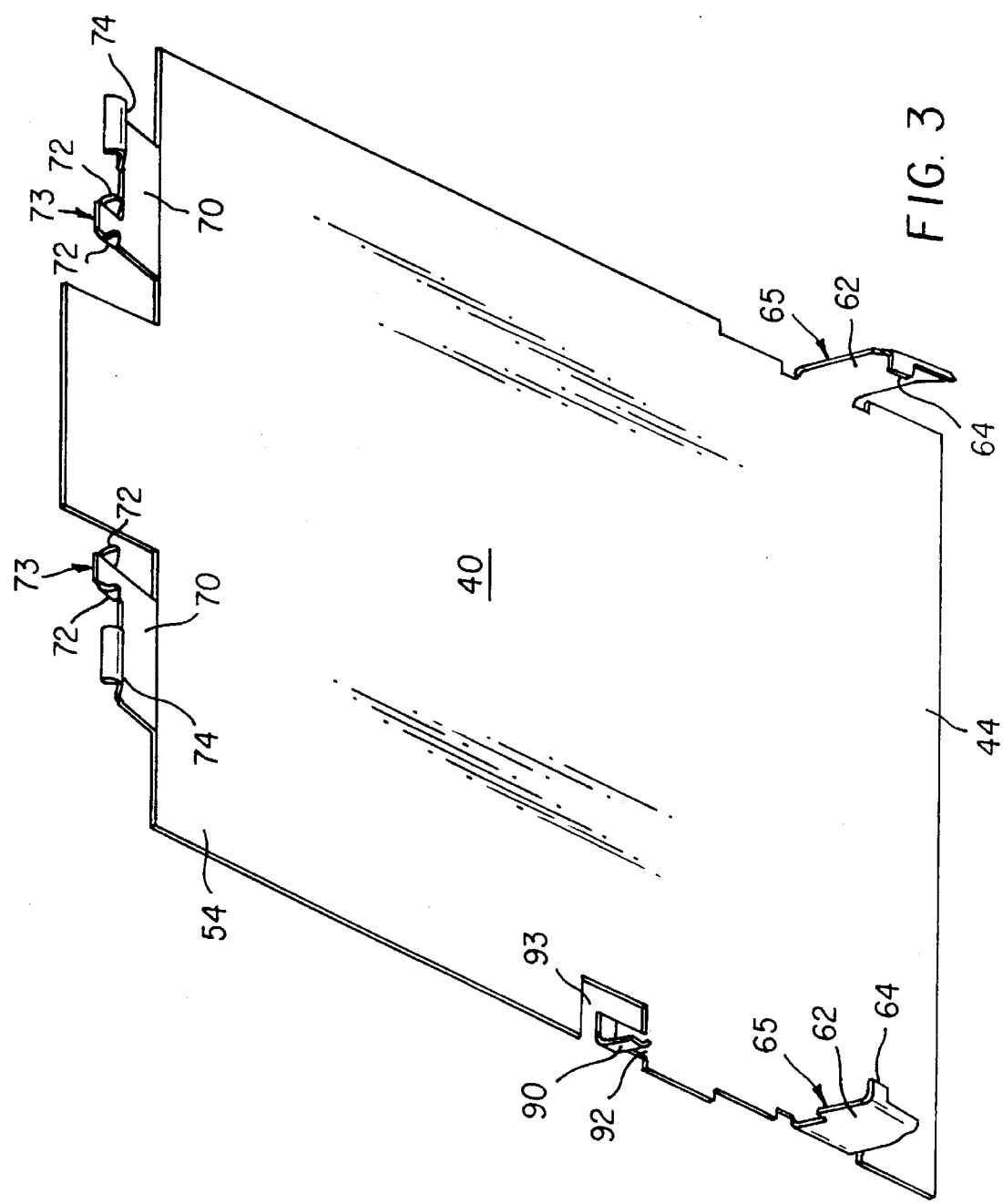
FIG. 3 is a perspective view of a light shielding strip configured in accordance with the present invention.
Figure 4:
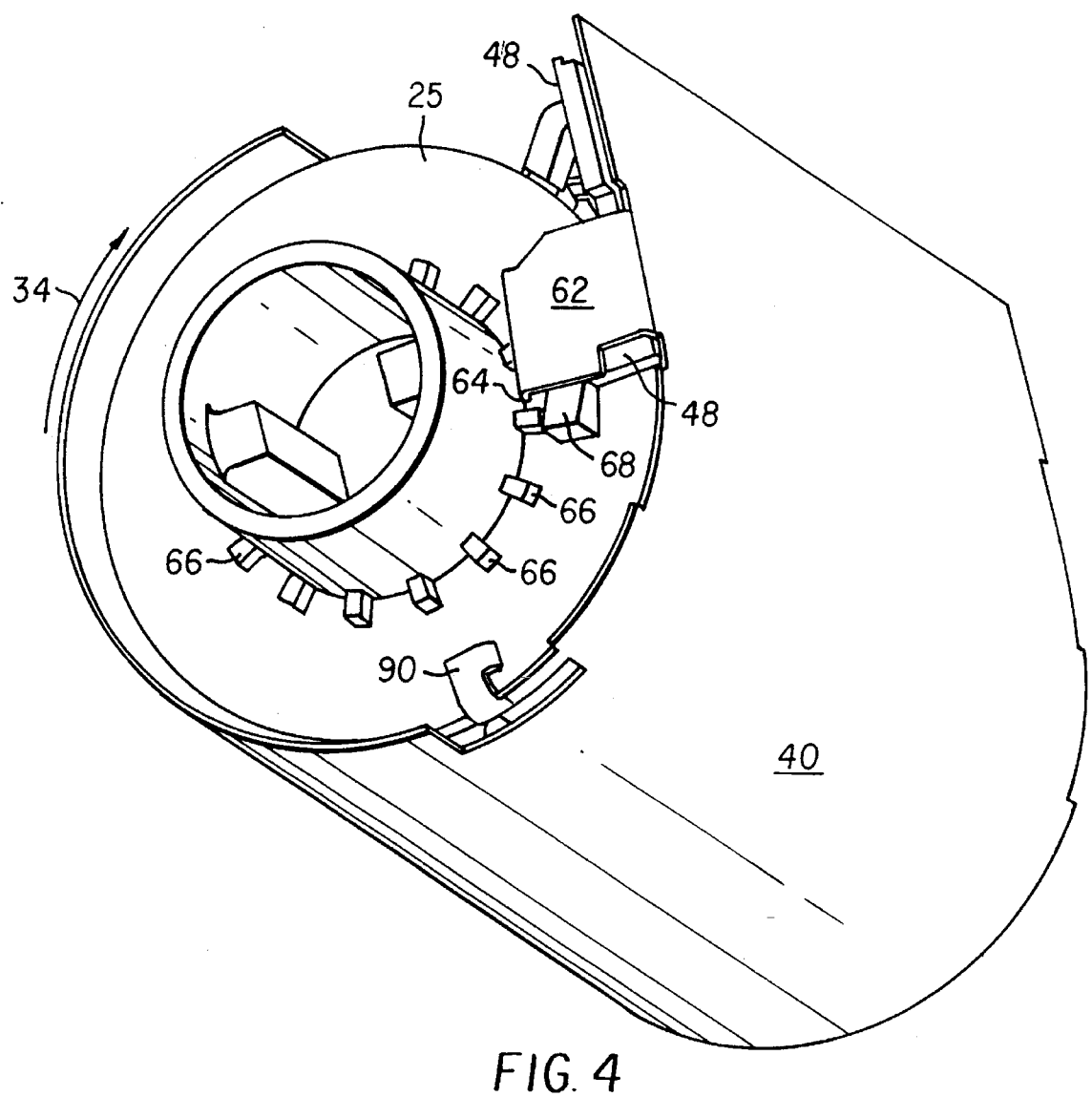
FIG. 4 is a perspective view of the embodiment of FIGS. 1-3 with components of the film cartridge assembled.

Referring now mainly to FIGS. 3–7 in conjunction with FIGS. 1 and 2, it is seen that the light sealing strip 40 is formed as a single mylar sheet which is initially flat so that when it is curled and mounted in the housing 22 (FIGS. 1 and 2), it tends to bias itself outwardly toward the cylindrical wall surface 42 of the housing. As is best seen in FIG. 3, the light shielding strip 40 has a pair of spring arms 62, each of which has a tab 64 extending inwardly therefrom to form first detents 65. As is seen in FIG. 4, when the light shielding strip 40 is curled around the supply spool 25, the tabs 64 are in the path of teeth 66 on both ends of the supply spool which latch with the tabs to pull the light shielding strip in the open direction of arrow 34. This couples the light shielding strip 40 to the spool 25 so that the light shielding strip advances with the film strip 26 as the film strip advances. This pulls the first end portion 44 of the light shielding strip 40 out of alignment with the film slot 33 (FIGS. 1 and 2) to the FIG. 2 position, allowing the film strip 26 to project through the film slot. The cross brace 48 is fixed to the second shell 24 of the housing 22 so as to remain stationary with respect to the spool 25 and the light shielding slide 40.

Referring mainly to FIG. 4 in conjunction with FIG. 2, when each of the spring arms 62 engages a ramp 68 on the cross brace 48, the spring arm 62 is cammed outwardly which removes its tabs 64 from the path of the teeth 66. This decouples the light sealing strip 40 from the spool 25 so as to arrest movement of the light sealing strip which is retained in the FIG. 2 position as the film strip 26 dispenses from the housing 22. As long as the light sealing strip 40 is in the FIG. 2 position, the spring arm 62 will be deflected by the cam 68 and the spool 25 can rotate in either direction. Consequently, when the film strip 26 is rewound to form the film coil 27, the edge of the first end portion 44 of the light sealing strip 40 remains retracted in slot 50 and displaced from the film strip.

Figure 5:
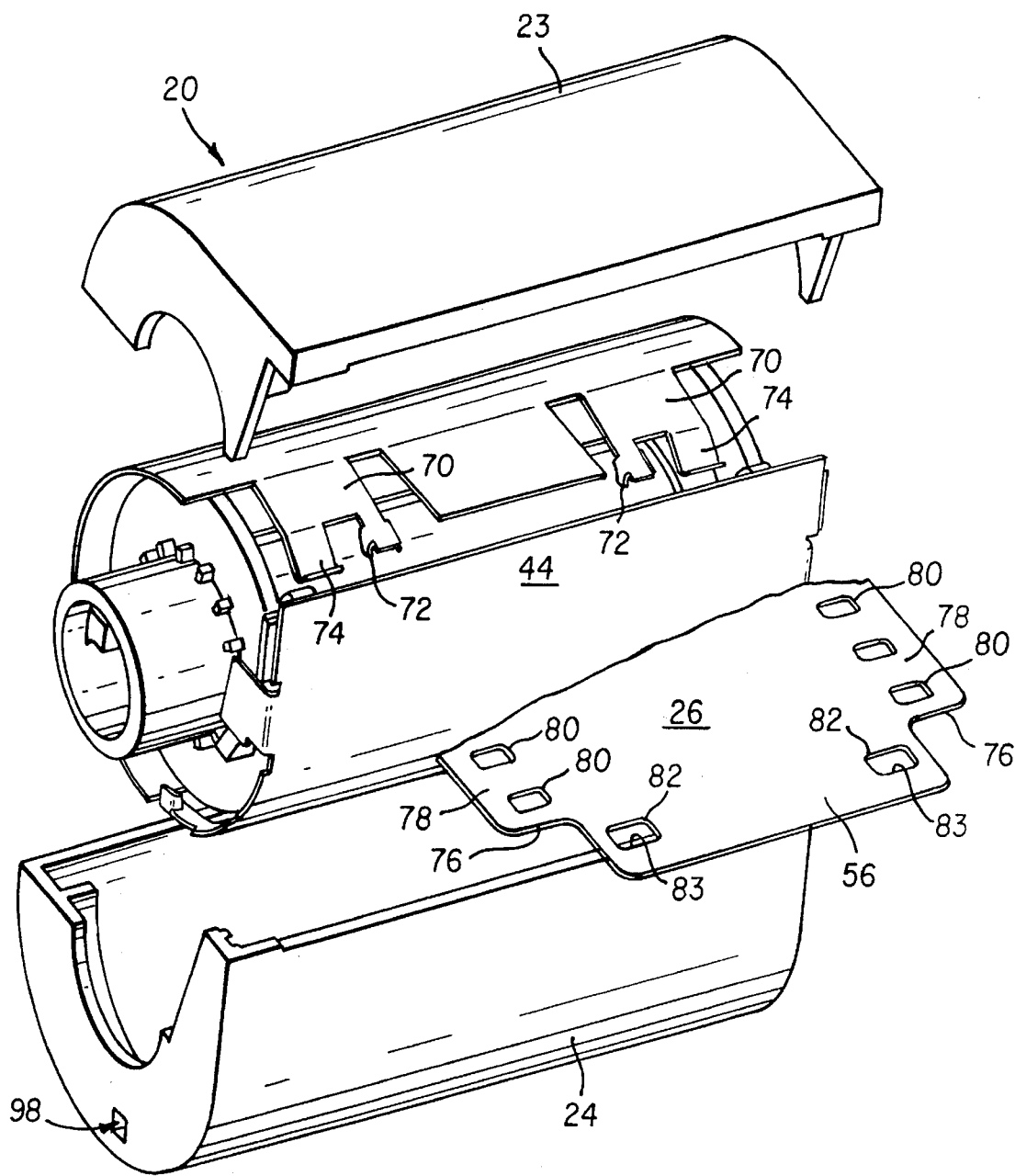
FIG. 5 is an exploded perspective view showing the components of the first embodiment of a film cartridge.

Referring now mainly to FIG. 5 in combination with FIGS. 2 and 1, in that order, it is seen that the light sealing strip 40 has longitudinal spring arms 70, each of which have depended therefrom double hook pairs 72 that cooperate with the spring arms to form second detents 73. In addition, each spring arm 70 has edge followers 74 depended therefrom. As have been previously explained, when the film strip 40 is advanced from the FIG. 1 to the FIG. 2 position, the slot 44 is initially opened. Moreover, the edge followers 74 are engaged by edge portions 76 on the film strip 26 proximate the film lead 56. As the film strip 26 advances, the edge portions 76 cam the edge followers 74 upwardly from the FIG. 1 position to the FIG. 2 position where the edge followers rest on the side portions 78 of the film strip which contain the sprocket holes 80. When the edge followers 74 are lifted by the edge portions 76, this also lifts the longitudinally extending spring arm 70 which lift the double hook pairs 72 from holes 82 in the film lead 56.

As the film strip 26 is returned to the housing 22 by rotation of the spool 25 in the direction of arrow 35, the edge followers 74 keep the double hook pairs 72 clear of the holes 82 until the edge followers 74 drop from edge 76 allowing the arms 70 to move toward the film strip 26 so that the double hook pairs 72 drop into the holes 82. The trailing edges 83 of the holes 82 then engage the hook pairs 72 to recouple the light shielding strip 40 with the film strip 26 so that the light shielding strip moves with the film strip as the film strip is coiled by the supply spool 25 into the coil 27. This movement of the light shielding strip 40 causes the light shielding strip to insert the first end portion 44 thereof into the groove 46, thus covering the slot 33 as is seen in FIG. 1.

Since the supply spool 25 is accessible once the cartridge 20 is removed from the camera, the film strip 26 could be exposed by simply turning the spool 25 to advance the film. This would cause the first end portion 44 to be withdrawn from the film slot 33 allowing light into the housing 22. In order to prevent this, the light shielding strip 40 has a locking tab 90 which projects therefrom on a spring arm 92 which is disposed in an opening 93 adjacent one edge of the light shield strip (see FIG. 3).

Figure 6:
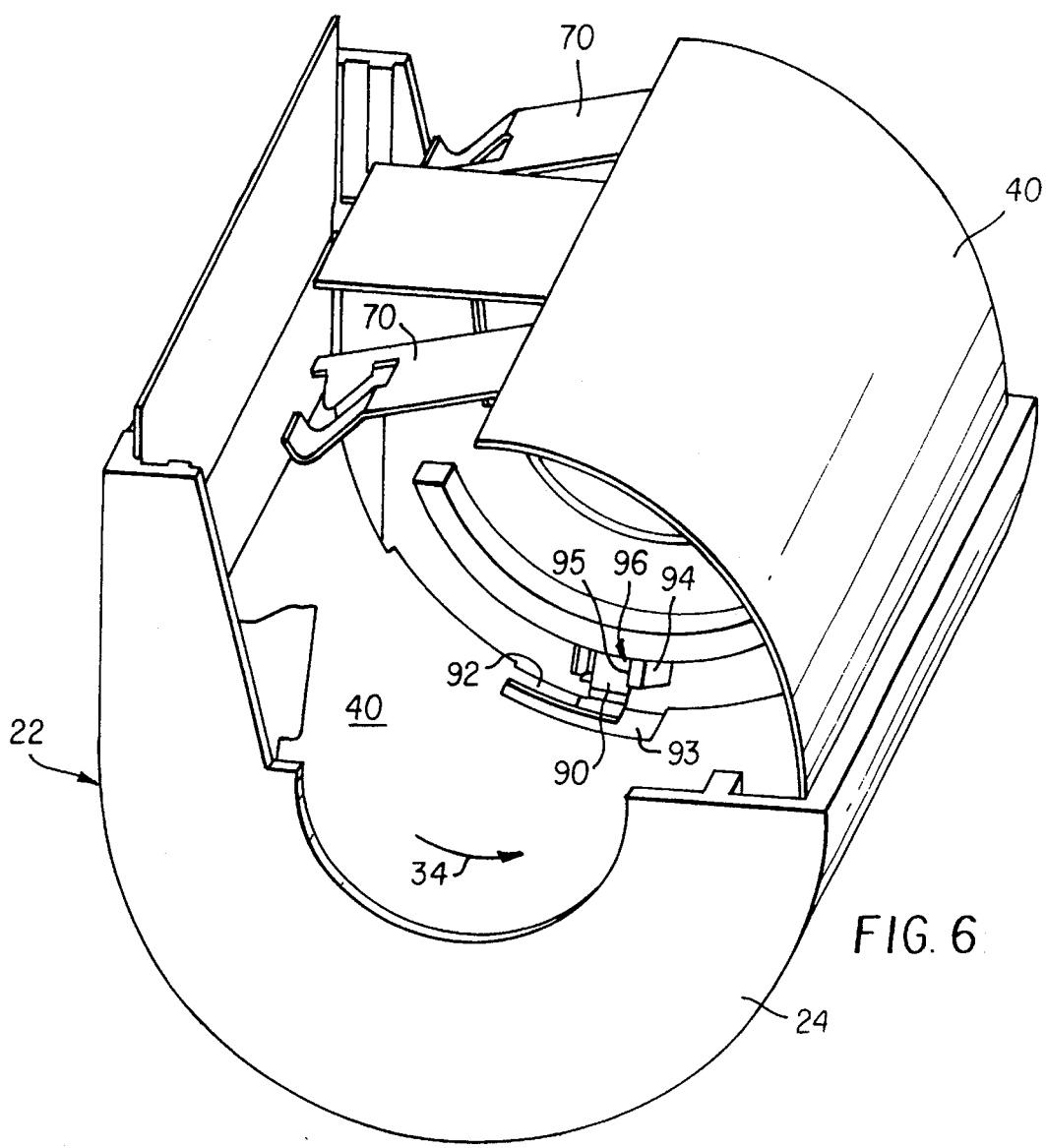
FIG. 6 is a perspective view showing a shell comprising one half of the film cartridge housing with only the light shielding strip disposed therein.

As is seen in FIG. 6, the locking tab 90 engages a ramp 94 fixed to the second shell 24 of the housing 22. The ramp 94 has a shoulder 95 which is engaged by the locking tab 90 to form a stop 96 preventing the light shielding strip 40 from rotating to the open position in the direction of arrow 34 when one attempts to rotate the supply spool 25 in the direction of the arrow 34.

Figure 7:
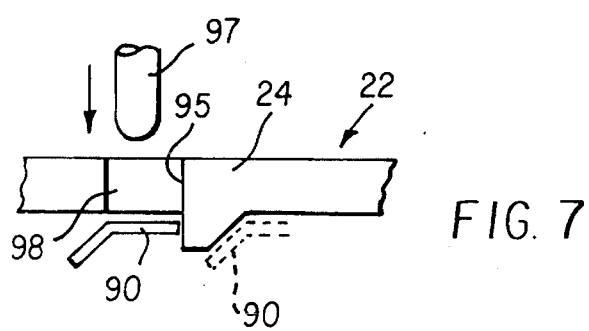
FIG. 7 is a side elevation of a locking arrangement for the light shielding strip.

As is seen in FIG. 7, a stop disengaging pin 97 movable through a hole 98 in the side of the second shell 24 of the housing 22 is activated by the camera to engage the locking tab 90 and push the tab 90 clear of the shoulder 95 when the camera (not shown) is operated to rotate the spool in the direction of arrow 34 (see FIGS. 1 and 2).

SECOND EMBODIMENT OF THE INVENTION

Figure 8:
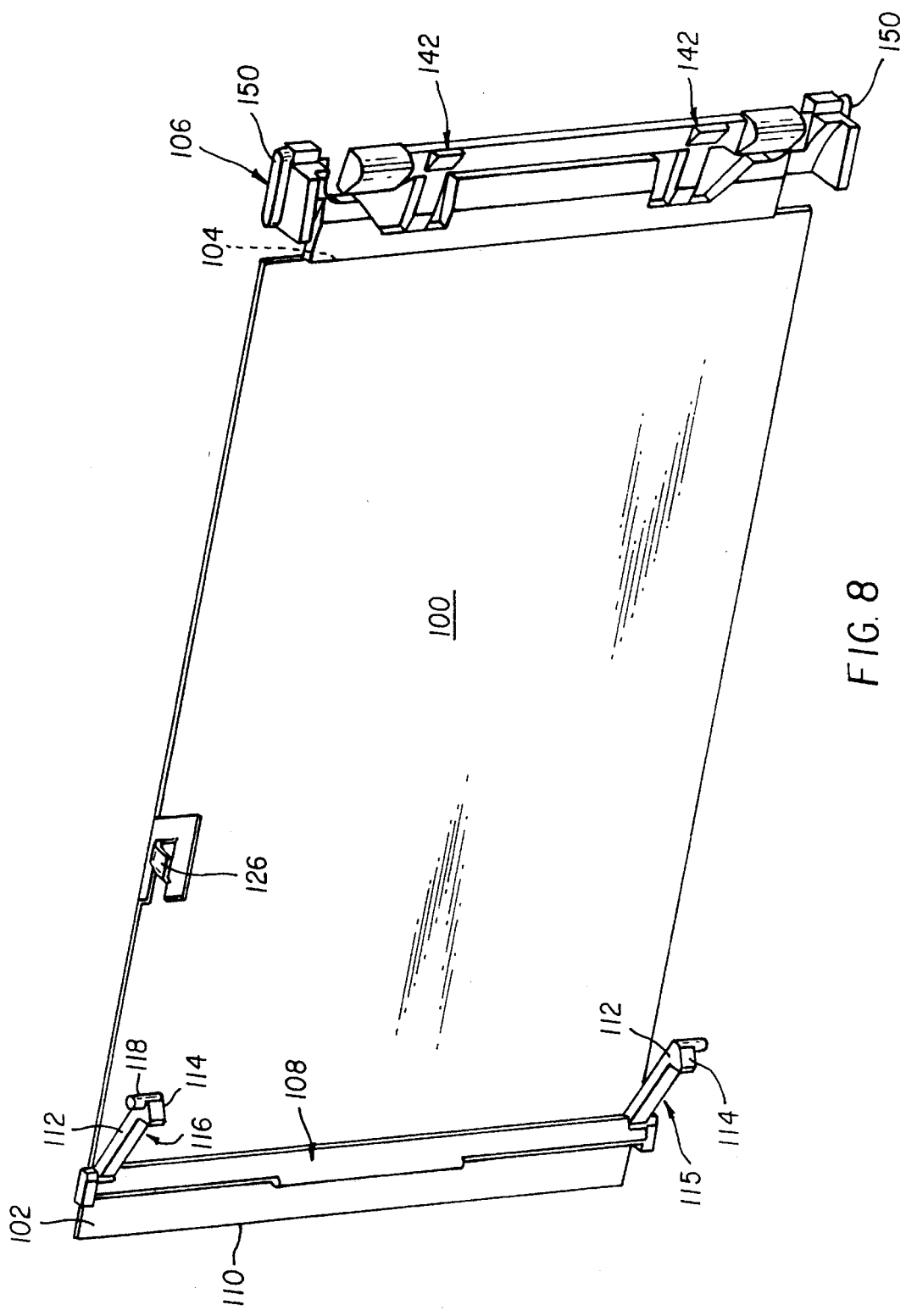
FIG. 8 is a perspective view of a second embodiment of the light shielding strip in accordance with the present invention.
Figure 9:
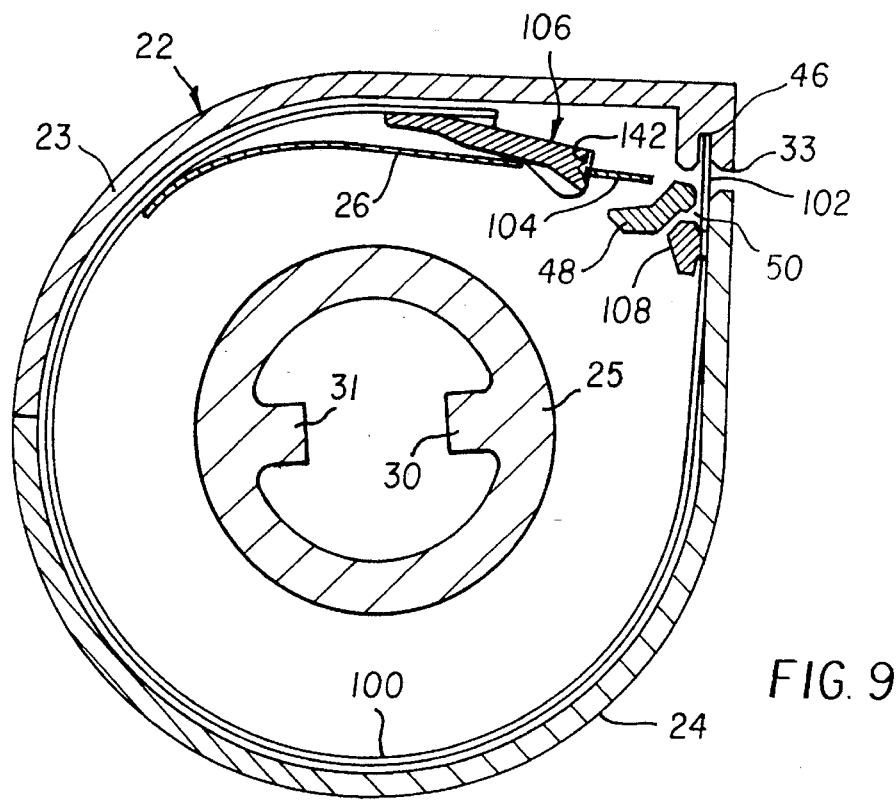
FIG. 9 is an elevation of the film cartridge with the film slot thereof closed by the light shielding strip of FIG. 8.
Figure 10:
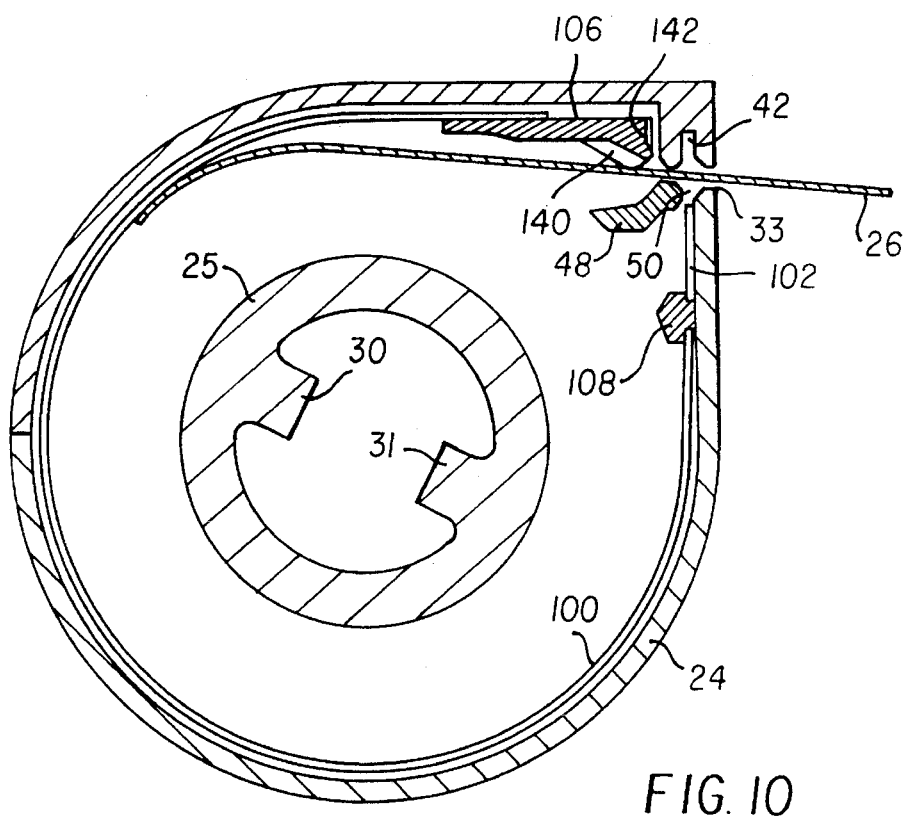
FIG. 10 is a view similar to FIG. 9 but showing the film slot open and the film strip being dispensed therefrom.

Referring now to FIGS. 8–16, there is shown a second embodiment of the invention wherein the light shielding slide now has the configuration of the light shielding strip 100 of FIG. 8. As in the first embodiment, the light shielding strip 100 of FIG. 8 is curled inside of the housing 22 around the coiled film strip 26 as is seen in FIGS. 9 and 10.

The light sealing strip 100 has a first end portion 102 and a second end portion 104. Attached to the second end portion 104, there is a closing piece 106 and attached proximate the first end portion 102 there is an opening piece 108 which is displaced from the edge 110 of the light shielding strip. As is seen in FIG. 9, the first end portion 102 extends across the film slot 33 and seats in the slot 46 in a manner similar to the arrangement of FIG. 1. As is seen in FIG. 10, the first end portion 102 is withdrawn from across the film slot into the slot 50 when the film strip 26 is advanced from the supply spool 25.

Figure 11:
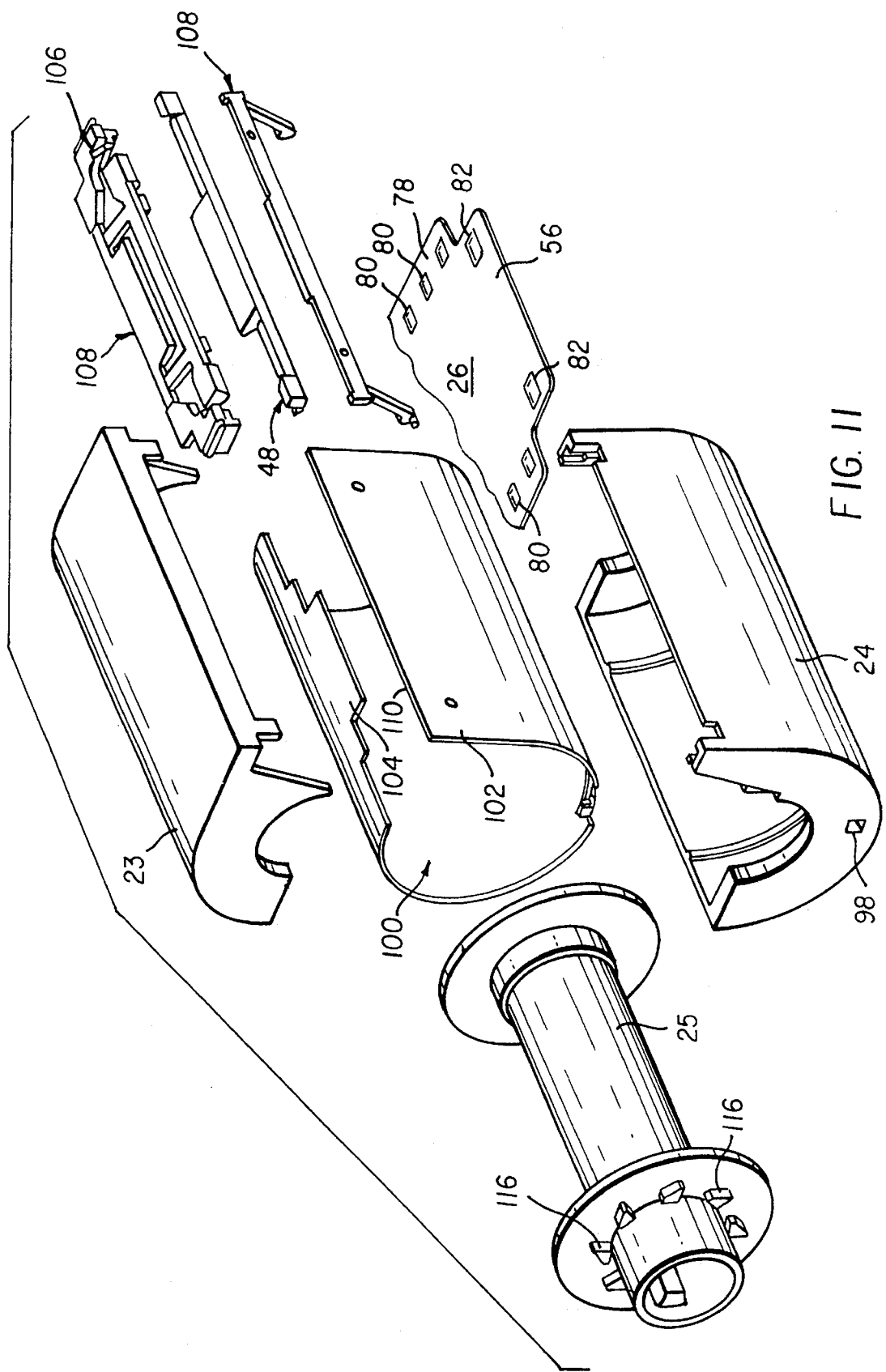
FIG. 11 is an exploded perspective view showing the components comprising the second embodiment of the invention.

As is seen in FIG. 11, the light sealing strip 100 is assembled with the supply spool 25 and film strip 26 for insertion within the housing 22 formed by the first and second shells 23 and 24 with the opening piece 108 and closing piece 106 being separate components mounted on the light shielding strip.

Figure 12:
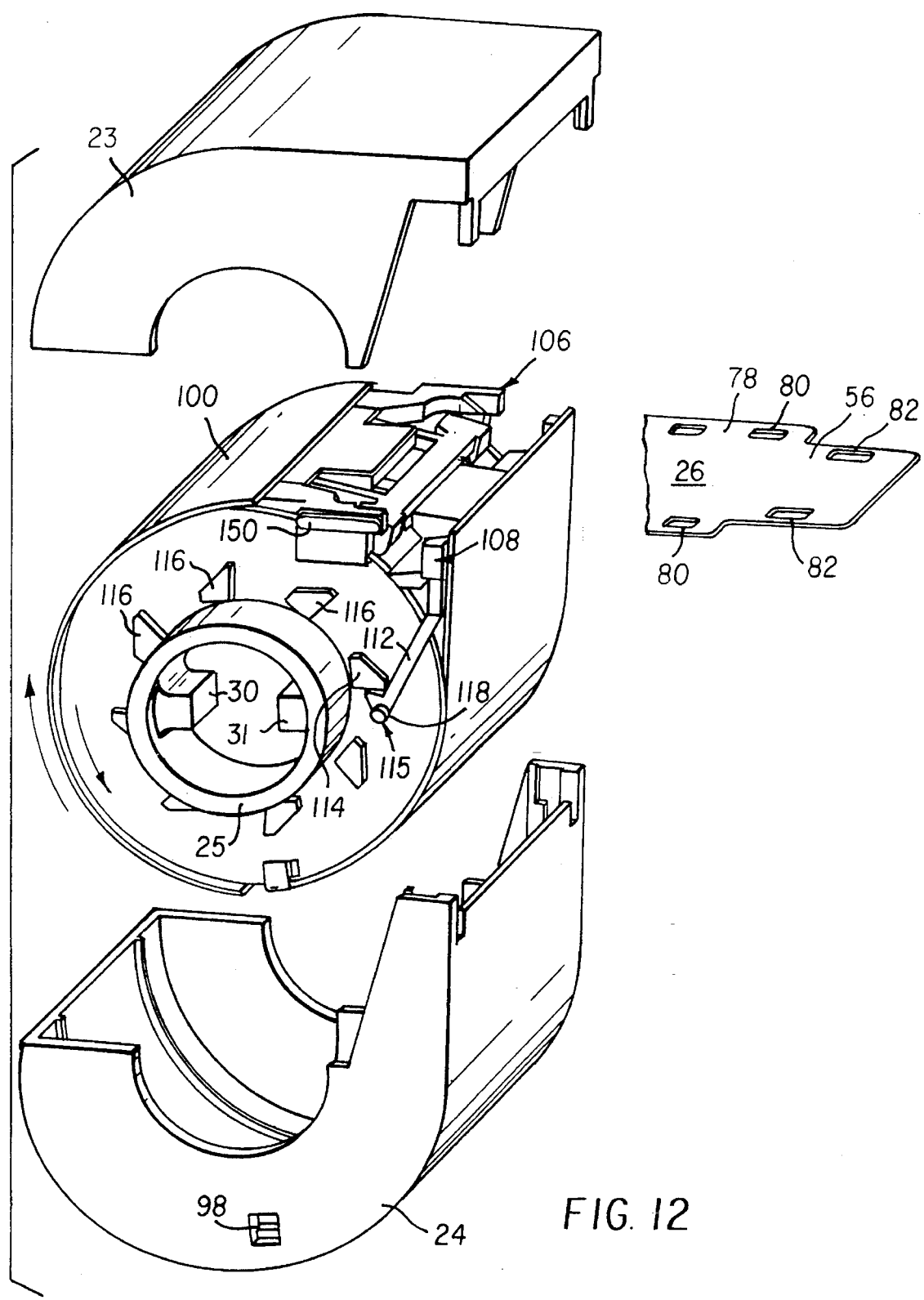
FIG. 12 is an exploded perspective view of the cartridge showing the light shielding strip being opened by rotation of the supply spool.
Figure 13:
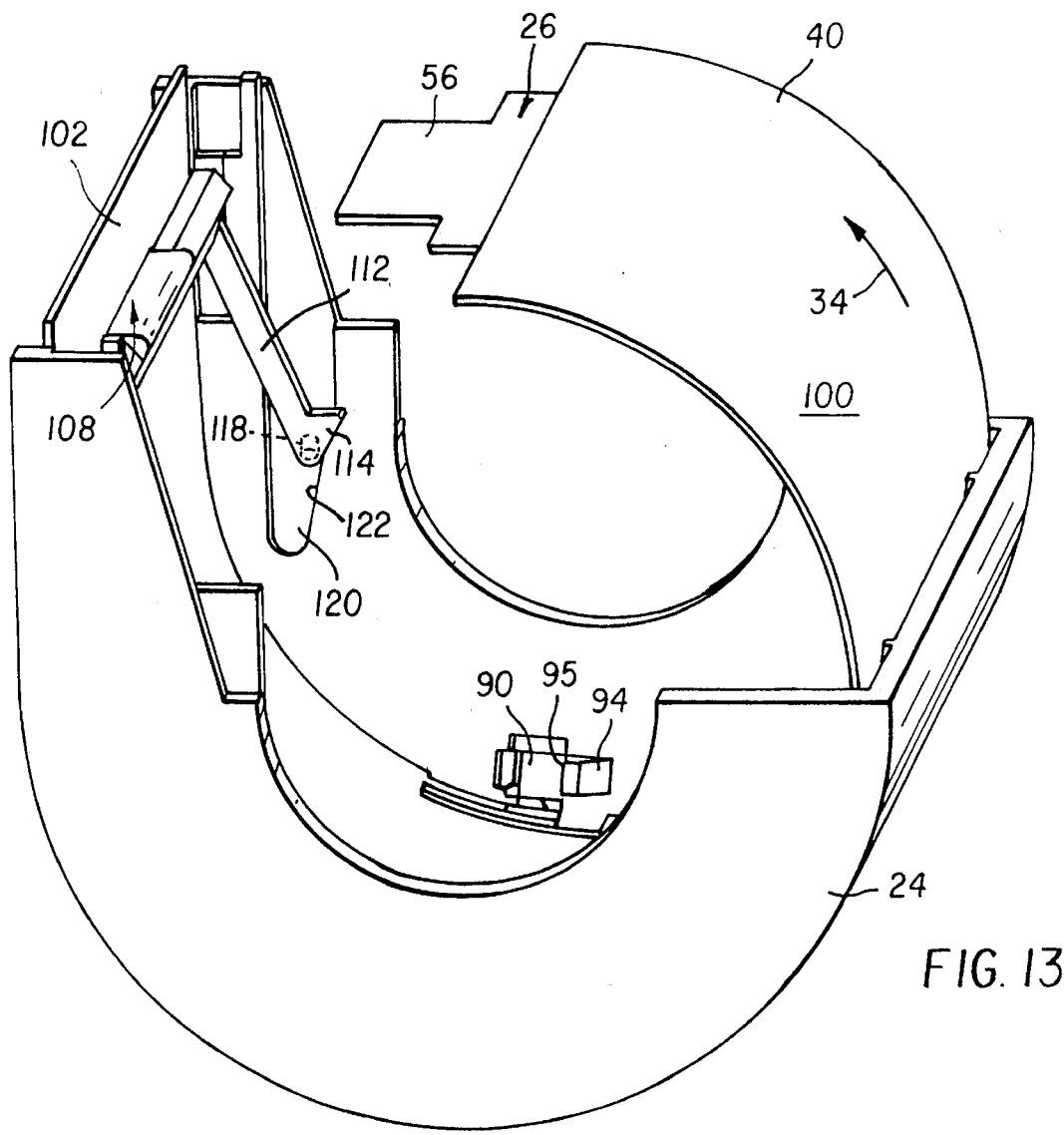
FIG. 13 is a perspective view of the film cartridge of FIGS. 9-11 but showing just the light shielding strip disposed in the shell forming one-half of the cartridge.
Figure 14:
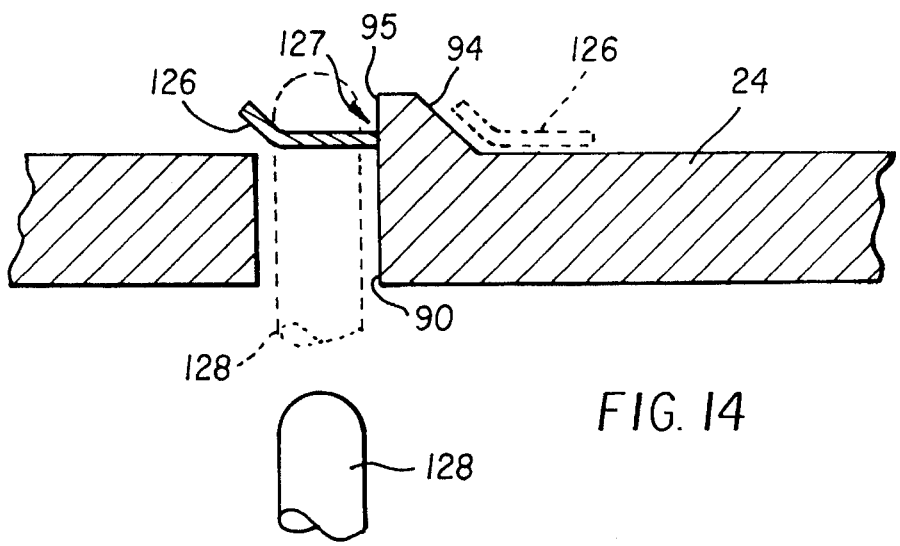
FIG. 14 is an elevational view, with portions in dotted lines, showing portions of the shell and the light shielding strip cooperating with an unlocking pin.

As is best seen in FIG. 12, the opening piece 108 has flexible arms 112 thereon with hooked ends 114 that form first detents 115 which latch with teeth 116 on the supply spool 25 in order to couple the light shielding strip to move with the film strip 26 as the film strip advances. This pulls the light shielding strip 100 from the FIG. 9 position to the FIG. 10 position. Each of the flexible arms 112 has disposed thereon an engagement pin 118 which rides in a groove 120 in the shell 24 of the housing 22 to control the position of the flexible arms. As is seen best in FIG. 13 in conjunction with FIG. 12, the grooves 120 each have a surface 122 which engages the engagement pin 118 so that as the light shielding strip 100 moves in the direction of arrow 34, the hooked end 114 is pulled gradually away from the teeth 116 on the supply spool 25, thus, decoupling the light shielding slide from the supply spool after the first end portion 102 is extracted from the slot 46.

As with the first embodiment of FIGS. 1–7, it is necessary to lock the light shielding strip 100 from movement until the cartridge 20 is mounted in the camera. Again, this is accomplished by engaging a locking tab 126 which forms a stop 127 with the shoulder 95 with a stop disengaging pin 128 (see FIG. 14) which is projected by the camera (not shown) in which the cartridge is mounted. The pin 128 projects through the hole 98 in the second shell 24 of the housing 22 and pushes the locking tab 126 out of locking engagement with the shoulder 95 on the casing of the housing so that the light shielding strip 100 is free to move with respect to the housing of the cartridge 20. This causes the engagement hooks 114 on flexible arms 112 to be gradually withdrawn from the spool teeth 116 (see FIGS. 12 and 13).

Figure 15:
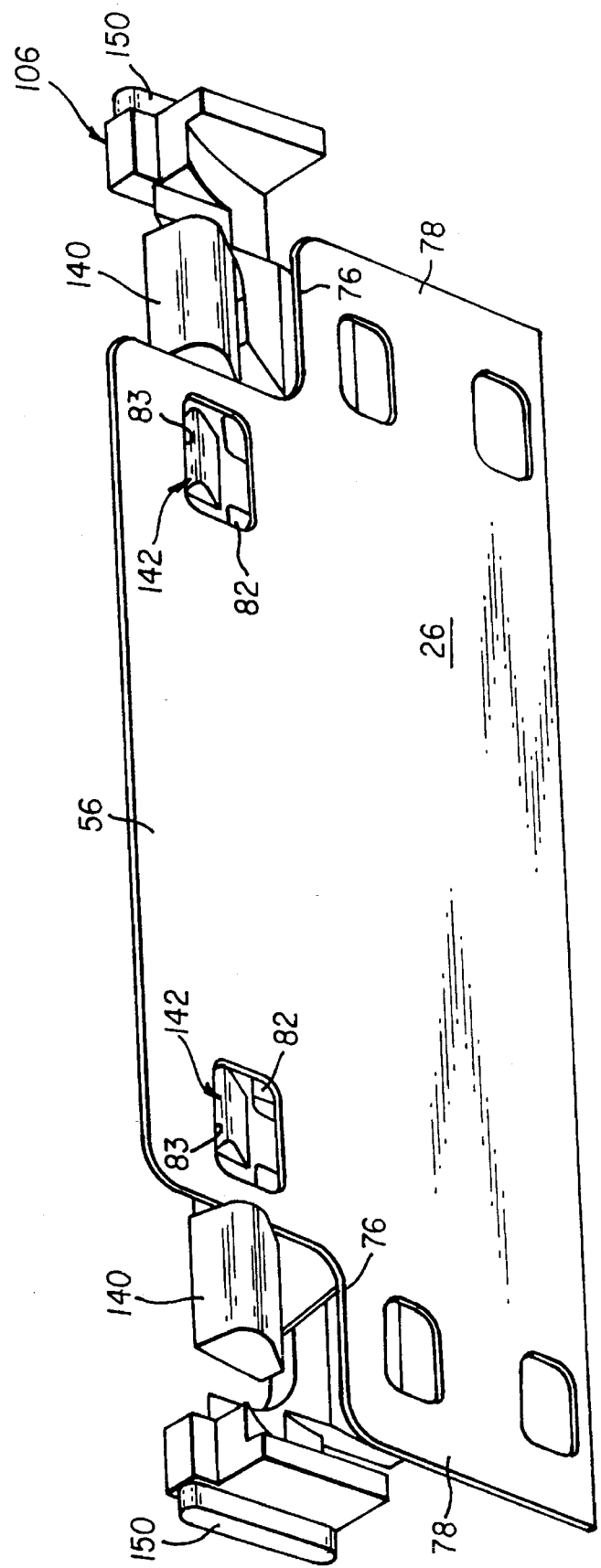
FIG. 15 is a perspective view of a film lead portion of the film strip cooperating with detents on the light shielding strip.
Figure 16:
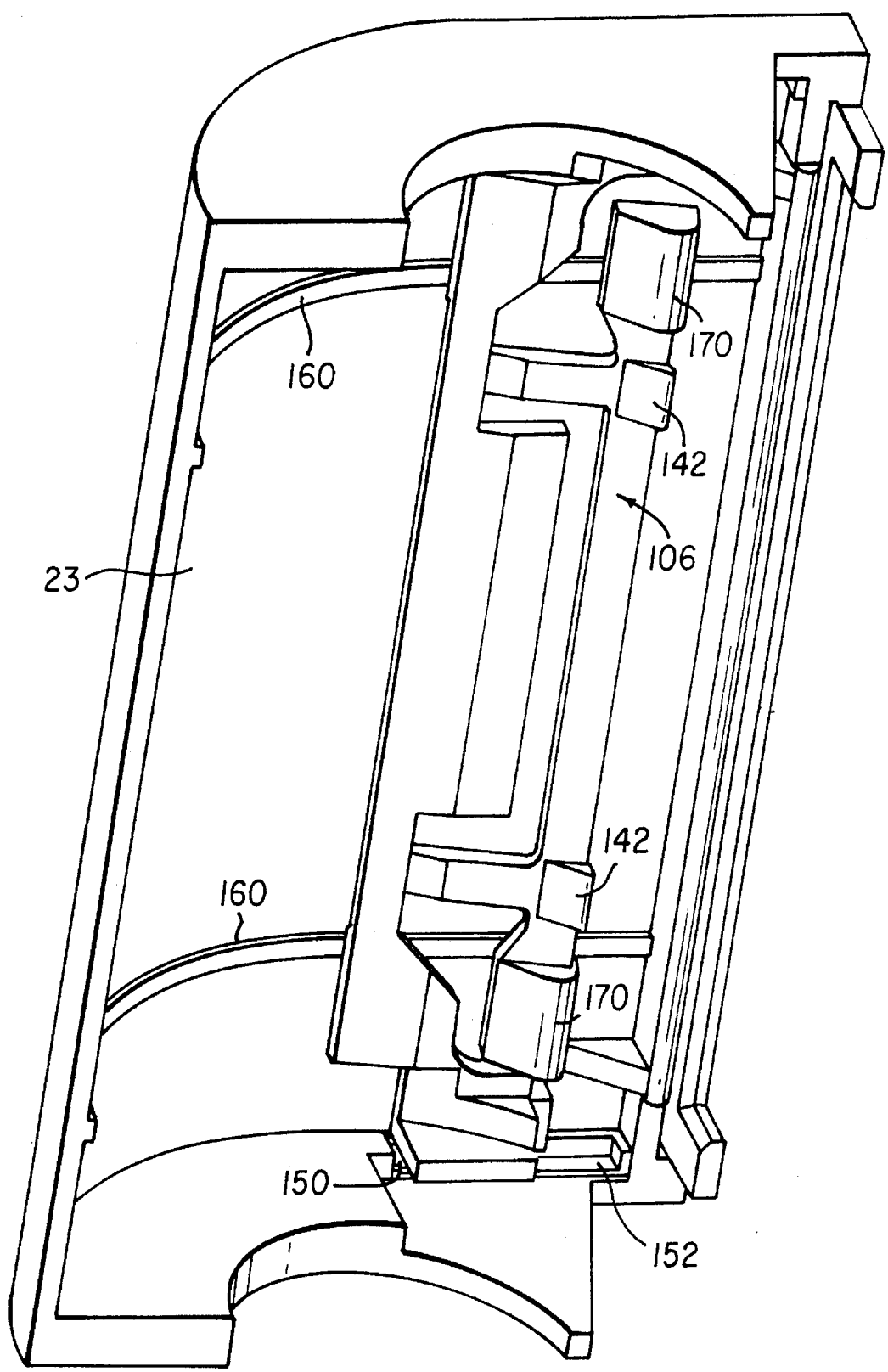
FIG. 16 is a perspective view of another shell portion of the housing showing cooperation with a closing piece on the light sealing strip.

Referring now mainly to FIG. 15, in moving from the FIG. 10 mode, wherein the film strip 26 is projecting through the film slot 33 in the housing 22, to the FIG. 9 mode where the film slot is closed, the closing piece 106 cooperates with the film leader 56. The closing piece 106 is fixed to the second end portion 104 of the light sealing strip 100 and therefore travels with the strip (see also FIG. 8). The closing piece 106 has a pair of edge followers 140 which, when the film strip 26 is projected, rest on the longitudinal edge portion 78 of the film strip. As the film strip is retracted from the FIG. 10 to the FIG. 9 position, the edge followers 140 are biased past the plane of the film strip 26 and clear edges 76 thereof. This causes a pair of second detents 142 to project into the openings 82 in the film leader 56 and to latch therewith. The edges 83 of the holes 82 then couple with the second detents 142 to cam the closing piece 106 back as the film strip 26 rewinds and causes the light shielding strip 100 to move to the FIG. 9 position wherein the first end portion 102 thereof blocks the opening 33. The closing piece 106 has a pair of projections 150 which are received in grooves 152 in the housing 22 (see FIG. 16) to guide the second detents 142.

Preferably, the light shielding strip 100 rests on a pair of arcuate ribs 160 so as to move more easily within the housing 22 than if disposed against the inner surface 92 of the housing as is the case with the first embodiment.

With both the first and second embodiments of the this invention, the film slot 33 in the housing 22 is closed by a sliding light shield 40 or 100 which cannot be readily pivoted out of alignment with the film slot. Consequently, the light shield 40 or 100 is locked in place and when the film cartridge 20 is not loaded in a camera.

| | Parts List |
|---|---|
| 20 | Film cartridge |
| 22 | Housing |
| 23 | First shell |
| 24 | Second shell |
| 25 | Supply spool |
| 26 | Film strip |
| 27 | Coil of film |
| 30 | Lug |
| 31 | Lug |
| 34 | Directional arrow |
| 35 | Directional arrow |
| 40 | Light shielding strip |
| 42 | Inner wall surface |
| 44 | First end portion |
| 46 | Groove |
| 48 | Cross brace |
| 50 | Slot behind cross brace |
| 54 | Second end portion |
| 56 | Film lead |
| 62 | Spring arms |
| 64 | Tabs |
| 65 | First detents |
| 66 | Teeth |
| 68 | Ramp |
| 70 | Spring arms |
| 72 | Hook pairs |
| 73 | Second detents |
| 74 | Followers |
| 75 | Edge portions on film strip |
| 78 | Side portions |
| 80 | Sprocket holes |
| 82 | Holes |
| 83 | Trailing edges of holes |
| 90 | Locking tab |
| 92 | Spring arm |
| 93 | Opening |
| 94 | Ramp |
| 95 | Shoulder |
| 96 | Stop |
| 97 | Stop disengaging pin |
| 98 | Hole in side of housing |
| 100 | Light shielding strip |
| 102 | First end portion |
| 104 | Second end portion |
| 106 | Closing piece |
| 108 | Opening piece |
| 110 | Edge |
| 112 | Flexible arms |
| 114 | Hooked ends |
| 115 | First detents |
| 116 | Teeth |
| 118 | Engagement pin |
| 120 | Groove |
| 122 | Surface |
| 126 | Locking tab |
| 127 | Stop |
| 128 | Stop disengaging pin |
| 140 | Edge follower |

-continued

| | Parts List |
|---|---|
| 142 | Second detents |
| 150 | Sliders |
| 152 | Grooves |
| 160 | Arcuate ribs |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a film cartridge having a housing for containing a film strip having a film lead, the film strip having a selected width and being coiled around a film spool disposed within the housing; the film cartridge housing including a slot of a width complimenting the width of the film strip through which slot the film strip is dispensed for exposure in a photographic device and back through which the film strip is withdrawn after exposure, the slot being closed when the film strip is completely coiled in the cartridge and being open when the film strip is passing therethrough, the improvement comprising:

a light shielding strip disposed in the film cartridge, the light shielding strip being separate from and positioned around the film strip when the film strip is coiled in the film cartridge, the light shielding strip having a width at least as wide as the film strip and at least as wide as the width of the slot, the light shielding strip having a first end portion for covering the slot and a second end portion;

a coupling for coupling the light shielding strip to move with the film strip as the film strip is advanced initially to uncover the slot for decoupling the light shielding strip from the film strip after the slot is uncovered and for recoupling the light shielding strip to move with the film strip after the film strip is back within the cassette to thereby close the opening.

2. The cartridge of claim 1, wherein the coupling comprises a latch arrangement on the second end of the light seal strip for latching temporarily with the supply spool when the film strip is initially advanced to move the light sealing strip to uncover the slot and for latching with the film lead as the film strip is rewound to push the light shielding strip to recover the slot.

3. The cartridge of claim 2, wherein the latch arrangement comprises first and second detents at the first and second end portions of the light shielding strip, respectively, for engaging the supply spool and film lead, respectively.

4. The cartridge of claim 3, wherein the supply spool has a plurality of teeth for engaging the first detents and the housing has members thereon for disengaging the first detents from the teeth after the supply spool has rotated a distance sufficient to move the light shielding strip to uncover the slot.

5. The cartridge of claim 4, wherein the film lead has at least one hole aligned with at least one second detent for engagement by the second detent when the film lead is within the housing, whereby the film strip pulling the light sealing strip back into the film slot as the film strip is rewound.

6. The cartridge of claim 3, wherein the film lead has at least one hole aligned with at least one second detent for engagement by the second detent when the film lead is within the housing whereby the film strip pulls the light sealing strip back into the film slot as the film strip is rewound.

7. The cartridge of claim 3 further including a stop on the light shielding strip for engaging a member fixed with respect to the housing to prevent the light shielding strip from moving to uncover the film slot unless the stop is disengaged from the member and a stop disengager for releasing the stop prior to rotating the supply spool.

8. The cartridge of claim 1 further including at least two ribs on an inner surface of the housing for engaging the light shielding strip.

9. The cartridge of claim 3 further including guides in the housing for engaging the detents to control the motion thereof as the light sealing strip moves within the housing.

10. In combination with a film cartridge having a housing including therein a photographic film strip coiled in a roll around a spool and having a lead for advancement through a film slot in the housing, the improvement comprising:

a light shielding strip disposed in the housing around the roll, the light shielding strip having a first end portion for covering the film slot and a second end portion for coupling with the film strip;

first detents on the light shielding strip positioned proximate the first end portion thereof for latching temporarily with the spool to pull the first end portion away from the film slot; and second detents on the light shielding strip for coupling with the film strip proximate the lead as the film strip is retracted into the housing to push the first end portion of the light shielding to again cover the film slot.

11. The combination of claim 10, wherein the first and second detents are unitary with the light shielding strip.

12. The combination of claim 10, wherein the first and second detents are separate pieces mounted on the light shielding strip.

13. The combination of claim 10 further including a stop on the light shielding strip for engaging a portion of the housing for preventing movement of the light shielding strip to uncover the film slot unless the stop is disengaged and a stop disengager for disengaging the stop prior to rotating the film spool.

14. The combination of claim 10, wherein the detents each have projections extending therefrom and wherein the housing has grooves therein which receive the projections to guide the detents.

* * * * *

UNITED STATES PATENT AND TRADEMARK OFFICE
CERTIFICATE OF CORRECTION

PATENT NO. : 5,560,563
DATED : October 1, 1996
INVENTOR(S) : Wilbert F. Janson, Jr., et. al.

It is certified that error appears in the above-identified patent and that said Letters Patent is hereby corrected as shown below:

Column 1, Line 22 -- Delete "necessarily" and insert --necessary-- --
Column 8, Line 26 -- Delete "around a spool and having a lead for advancement through" and insert --around a spool and having a film lead for advancement through-- --

Signed and Sealed this

Sixteenth Day of December, 1997

Attest:

BRUCE LEHMAN

Attesting Officer          Commissioner of Patents and Trademarks